United States Patent

Ma

[11] Patent Number: 6,086,038
[45] Date of Patent: Jul. 11, 2000

[54] LINKAGE LOCKING DEVICE

[75] Inventor: Weijian Ma, Liverpool, N.Y.

[73] Assignee: Young & Franklin, Inc., Liverpool, N.Y.

[21] Appl. No.: 09/192,986

[22] Filed: Nov. 16, 1998

[51] Int. Cl.⁷ ................................................ F16K 31/16
[52] U.S. Cl. ........................... 251/58; 251/232; 251/234; 74/110; 74/516
[58] Field of Search ............................. 251/58, 232, 234; 74/110, 516, 519

[56] References Cited

U.S. PATENT DOCUMENTS

| | | | |
|---|---|---|---|
| 3,317,179 | 5/1967 | Willis | 251/58 |
| 3,474,829 | 10/1969 | Scheineman . | |
| 3,684,237 | 8/1972 | Hyde et al. | 251/58 |
| 3,952,995 | 4/1976 | Nagumo et al. | 251/58 X |
| 4,050,670 | 9/1977 | Borg et al. . | |
| 4,449,421 | 5/1984 | Olschewski et al. | 74/516 |
| 4,637,243 | 1/1987 | Bond | 74/110 X |
| 4,815,696 | 3/1989 | Lonardi . | |
| 5,078,180 | 1/1992 | Collins . | |
| 5,542,643 | 8/1996 | Breth . | |
| 5,967,486 | 8/1972 | McCrory et al. | 74/110 X |

Primary Examiner—Kevin Lee
Attorney, Agent, or Firm—Wall Marjama Bilinski & Burr

[57] ABSTRACT

Apparatus primarily for use in seating and unseating a valve by turning the valve stem between a fully opened and fully closed position. In one form of the invention, a lever arm attached to the valve stem is connected at one corner of a triangular shaped crank arm by a link. A second corner of the crank arm is rotatably mounted on a fixed shaft and the third corner is connected to an actuator. The shaft, the link and a pivot point on the distal end of the lever arm and are all brought into alignment along a common axis when the valve is in a fully closed position. Moving the actuator in the opposite direction breaks the alignment between the link and the crank arm and pulls the lever arm toward a valve opening position.

18 Claims, 2 Drawing Sheets

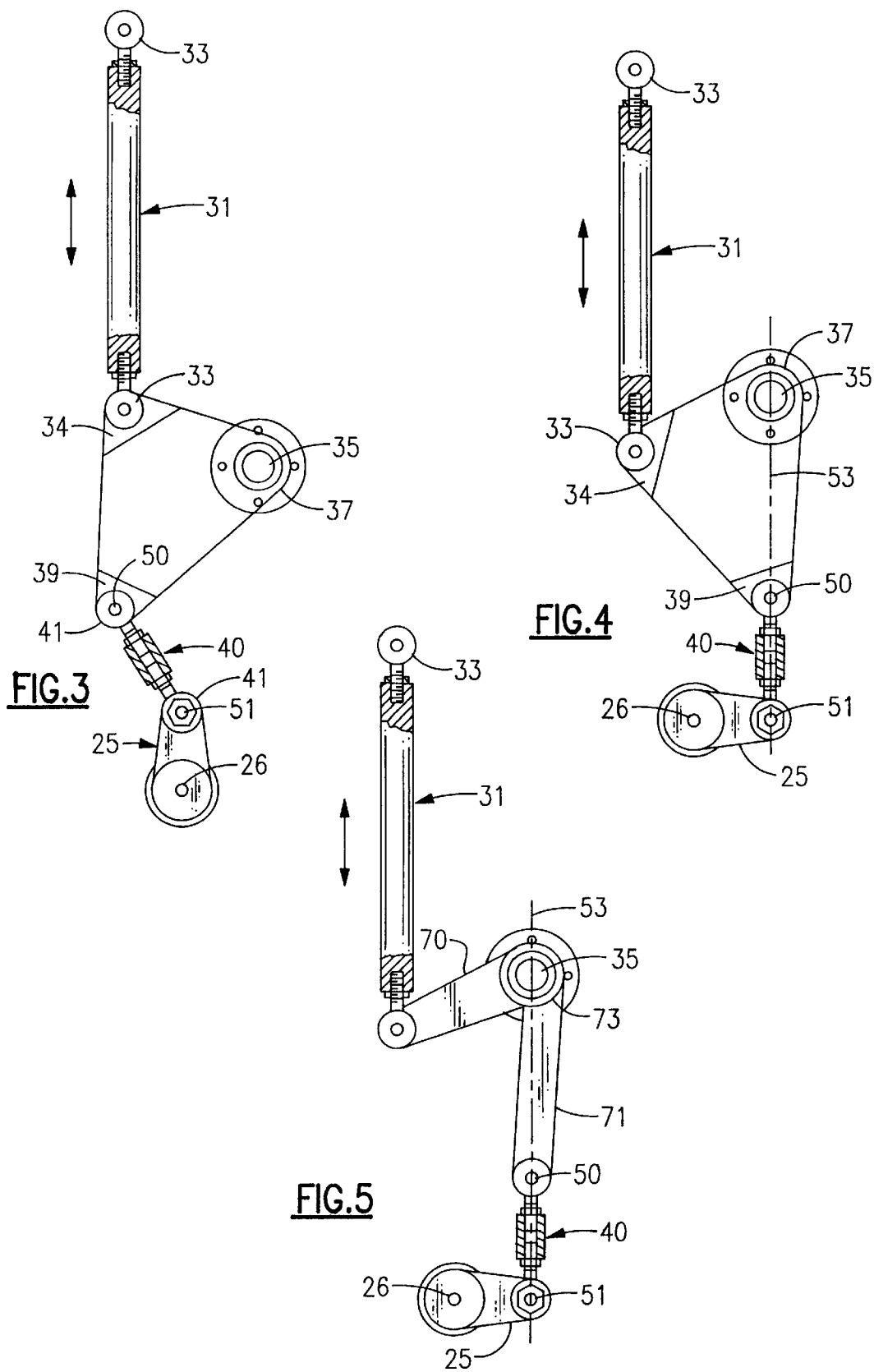

LINKAGE LOCKING DEVICE

BACKGROUND OF THE INVENTION

This invention relates to an actuator mechanism for providing high torque for seating and unseating a valve or the like. The mechanisms further provide a steady closing force against the valve stem to prevent the valve from opening in the event of surging.

U.S. Pat. No. 5,542,643 to Breth discloses a ball valve that is seated and unseated by means of a hydraulic actuator. The piston rod of the actuator is coupled to the lever arm of the valve by a plate. The plate contains slotted holes that permit the plate to be adjustably positioned between the valve lever arm and the piston rod of the actuator. Sufficient adjustment is provided so that the valve can be accurately positioned by the actuator between a fully closed and a fully opened position.

Collins, U.S. Pat. No. 5,078,180, further describes a hydraulically actuated gate valve. The actuator is again connected to the crank arm of the valve by means of plate-like linkage. The valve is opened and closed through the linkage as the piston rod of the hydraulic actuator is extended or retracted.

Although the prior art device provides additional torque for seating and unseating a valve, they are incapable of holding the valve closed when the valve experiences high internal surge pressures. Most valve actuators can seat and unseat a valve under normal conditions. However, they cannot also function simultaneously to lock the valve in a closed position. Additionally, many of these prior art devices close at a relatively high speed causing undue wear and breakage of the valve components.

SUMMARY OF THE INVENTION

It is a primary object of the present invention to improve apparatus for providing extremely high torque to a lever arm, or the like, to move the arm between a first and a second position.

A further object of the present invention is to improve apparatus for seating and unseating a valve.

A still further object of the present invention is to provide apparatus for providing a high torque for moving a lever arm, or the like, between a first closed position and a second opened position and simultaneously providing an extremely high locking force automatically against the lever arm when it is brought into the closed position.

Another object of the present invention is to provide a device that can open and close a valve and automatically lock the valve in the closed position with sufficient force to prevent the valve from inadvertently opening due to high internal surge pressures.

Yet another object of the present invention is to provide a valve actuator mechanism that can unseat the valve under adverse conditions using a minimum amount of force.

A still further object of the present invention is to provide a nearly zero valve crank arm speed when the valve reaches its closed position.

Yet a further object of the present invention is to provide a valve control apparatus having a linkage that is capable of operating in any direction without changing its performance characteristics.

These and other objects of the present invention are attained by apparatus for moving a lever arm between a first and a second position and locking and unlocking the lever arm in one of said positions. The apparatus includes an actuator rotatably coupled to a plate by a first pivotal connection to rotate the plate about a fixed shaft at a second pivotal connection. A link rotatably coupled at one end to the plate at a third pivotal connection and at the other end to the distal end of the lever arm by a fourth pivotal connection. The pivotal connections being arranged so that said second, third and fourth pivotal connections are aligned along a common axis when the lever arm is brought into the first position to lock the lever arm in said first position. The link and the plate form a hinge at the third pivotal connection which permits the link to angularly position itself as the lever arm is moved from the first position toward the second position to quickly unlock the lever arm.

In the preferred embodiment of the invention, the present apparatus is adapted to open and close a valve with the second, third and fourth pivotal connections being aligned when the valve is brought to a closed position.

BRIEF DESCRIPTION OF THE DRAWINGS

For a better understanding of these and other objects of the invention, reference will be made to the detailed description of the invention which is to be read in association with the following drawings, wherein:

FIG. 3 is an enlarged elevation showing the linkage mechanism employed in the present invention with the valve being in an open position; and FIG. 4 is a side elevation similar to that illustrated in FIG. 3 showing the valve in a closed position; and FIG. 5 is a further enlarged side elevation showing another embodiment of the present invention.

DESCRIPTION OF THE INVENTION

Turning now to the drawings, the present invention will be described with specific reference to apparatus for seating and unseating a valve. However, as should become evident from the disclosure below, the apparatus has greater utility and can be used in various applications involving the movement of a lever arm or the like between first and second positions. The apparatus of the present invention is capable of delivering high torque as well as providing an automatic locking and unlocking feature that will hold a valve, for example, closed against high internal pressure particularly during surge, and break the lock tending to hold the valve closed under equally high pressures. Furthermore, the present apparatus is arranged to deliver a nearly zero closing speed to the crank arm of a valve thus reducing the closing forces on the valve parts.

Figure 1:
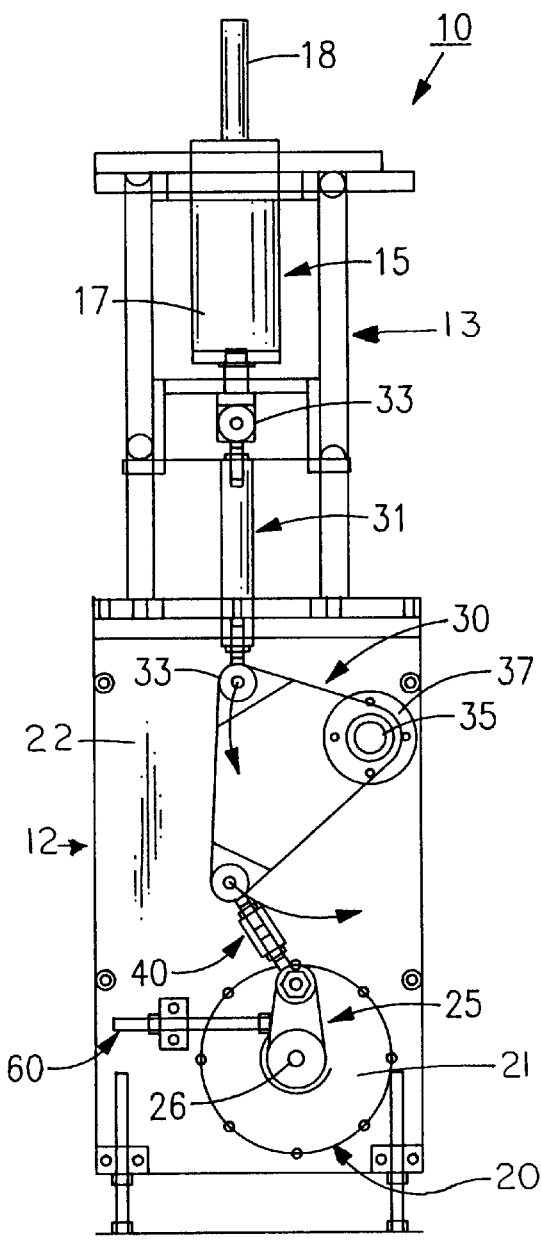
FIG. 1 is a side elevation of apparatus for operating a valve with the panels removed to better show the interior of the apparatus with the valve in an open position.
Figure 2:
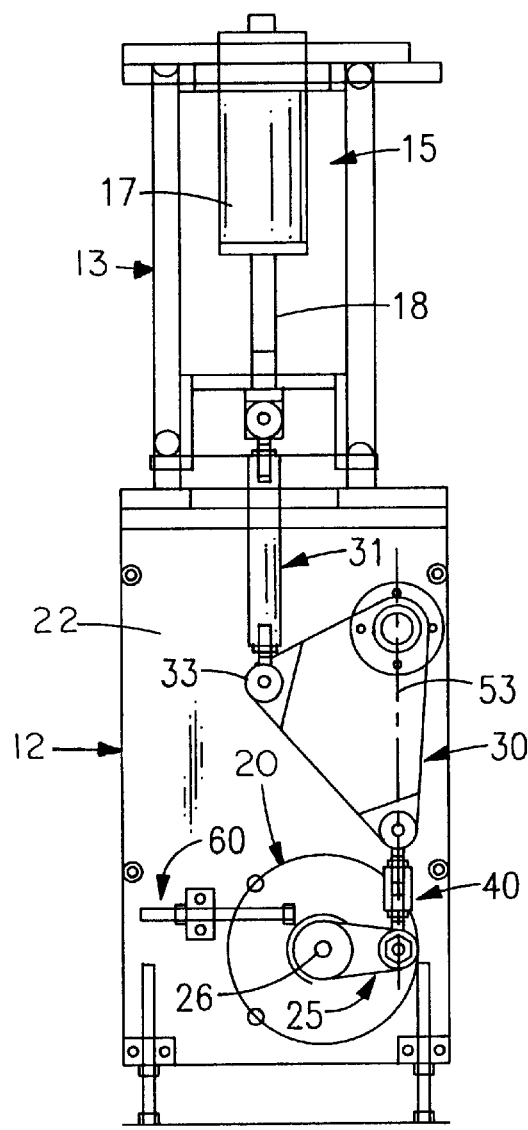
FIG. 2 is also a side elevation similar to that illustrated in FIG. 1 showing the valve in a closed position.

As illustrated in FIGS. 1 and 2, the apparatus of the present invention is housed within a fixture generally referenced 10 which has some of its panels removed to better show the interior thereof. The fixture includes a lower compartment 12 and an upper frame 13 mounted over the compartment. A hydraulic actuator 15 is mounted in the upper frame which includes a cylinder 17 containing a piston rod 18 that is arranged to reciprocate along a vertical path of travel indicated by the arrows. A valve generally referenced 20 is mounted via a bolting flange 21 located in the rear wall 22 of the lower compartment. A lever arm 25 is secured to the valve stem 26 and is arranged to move between a fully opened position as viewed in FIG. 1 and a fully closed position as viewed in FIG. 2.

The piston rod of the hydraulic actuator is connected to a triangular shaped crank arm generally referenced 30 by means of a link 31. The link contains a clevis 33 at each end that is threaded into the body of link so that the length of the link can be adjusted. The upper clevis is rotatably joined to the distal end of the hydraulic actuator's piston rod. The lower clevis is rotatably connected to the crank arm at one corner 34 thereof (FIG. 3 and 4).

The crank arm is rotatably supported upon a stub shaft 35 mounted in the back wall of the fixture. The shaft is located at a second corner 37 of the crank arm. The center of the shaft 38 thus provides a fixed pivot point 38 (FIG. 4) about which the crank turns as the piston rod 18 of the hydraulic actuator is extended and retracted.

The distal end of the valve lever arm 25 is rotatably connected to the third corner 39 of the crank arm by means of a second shorter link 40. Here a clevis 41 is threaded into the opposing ends of the link. The upper clevis is rotatably connected to the corner 39 of the crank arm by a suitable pivot and the lower clevis is similarly connected to the distal end of the lever arm.

The operation of the present linkage will be explained with further reference to FIGS. 3 and 4. The valve in this particular embodiment is arranged to be fully opened when the lever arm is in a twelve o'clock position as illustrated in FIG. 3. Moving the lever arm ninety degrees in a clockwise direction places the valve in a fully closed position. The geometry of the crank arm and the lengths of the links are set with regard to the stroke of the hydraulic actuator so that the lever arm moves through the required distance as the piston rod 31 is extended and retracted. As illustrated in FIG. 4, when the valve is brought to the fully closed position, the shaft 35, the pivot point 50 at corner 39 of the crank and the pivot point 51 at the distal end of the valve lever arm 25 are all brought into alignment along a common center line 53. The link 40 at this time is also axially aligned with the center line. Accordingly, any pressures or surges that are generated within the valve that might tend to open the valve act along the center line and are strongly resisted by the crank and link which at closure, combine to form a continuous rigid member extending between the shaft and the lever arm that is loaded in compression.

To unseat the valve, the actuator is simply retracted which pulls the center 51 back from the centerline 53 to rapidly unlock the valve and break whatever forces that might tend to hold the valve closed.

An adjustable stop 60 (FIGS. 1 and 2) is mounted within the fixture that is arranged to interrupt the rearward motion of the lever arm once it is brought to the fully opened position.

Turning now to FIG. 5, there is shown a second embodiment of the invention wherein the triangular shaped crank arm has been replaced by a pair of angular displaced bars 70 and 71. The first bar 70 is rotatably mounted at its proximal end upon a stationary shaft for rotation about the shaft. The second bar 71 is secured at its proximal end to the proximal end of the first bar 70 such that the second bar 71 rotates with the first bar 70. Thus, the proximal ends of the two bars are cojoined at a common hub 73 that is rotatably secured to the fixed shaft 35. Accordingly the two arms will move in unison as the hydraulic actuator is extended or retracted. The valve stem 26, as illustrated in FIG. 5, is again shown in a closed position. Here again, the linkage joining the lever arm to the actuator is arranged so that bar 71 and link 40 are brought into axial alignment along centerline 53 to provide maximum holding force against the valve stem capable of resisting internal forces that might otherwise tend to open the valve.

The crank arm 30 and the link 40 are arranged so that point 50 is an instant center about which the two bodies rotate relative to each other. As illustrated in FIG. 4, the velocity of the crank arm 25 approaches zero when the link is aligned along centerline 53 that passes through the center of the shaft 35. By making this zero velocity point correspond to the closure position of the valve, the internal impact forces of the valve generated at closure are considerably reduced when compared to other valve actuators. It should be further noted that the present actuator is not restricted as to where it can be mounted with regard to a valve. The valve actuator performance characteristic will remain unchanged regardless of the actuator position provided the centers 35, 50 and 51 all come into alignment along a common centerline at closure.

While this invention has been explained with reference to the structure disclosed herein, it is not confined to the details set forth and this invention is intended to cover any modifications and changes as may come within the scope of the following claims:

What is claimed is:

1. Apparatus for seating and unseating a valve that includes a lever arm attachable at one end to a valve stem of a valve for turning said valve stem from a closed position to an open position, said lever arm having an opposite end containing a rotor, a fixed shaft having a center lying upon a common center line with the lever arm rotor when the valve stem is in a closed position, a triangular crank arm rotatably mounted at one corner upon said shaft, and having first and second pivots located at the other corners, a linear actuator rotatably connected to said first pivot for rotating the crank arm in one direction as the actuator is extended and in a second direction as the actuator is retracted, a first link rotatably connected at one end to said second pivot and rotatably connected at the other end to said crank rotor, and said axis of said link, the center of said second pivot and the center of said shaft lying upon said common center line when said valve is closed.

2. The apparatus of claim 1 wherein said linear actuator is a fluid actuated cylinder having a piston arm connected to said first pivot of said crank arm.

3. The apparatus of claim 1 wherein said first link contains means for adjusting the axial length of the link.

4. The apparatus of claim 2 that further includes a second link for connecting the first pivot of said crank arm to the piston rod of said cylinder.

5. The apparatus of claim 4 that includes further means for adjusting the length of said second link.

6. The apparatus of claim 5 that further includes a stop means for interrupting the motion of said lever arm when said valve is in a fully opened position.

7. Apparatus for moving a lever arm between a first and a second position that includes a first crank arm rotatably mounted at a proximal end upon a stationary shaft for rotation about said shaft and a second crank arm secured at a proximal end to said first crank for rotation therewith, a first link pivotally connected at one end to a distal end of said first crank arm and pivotally connected at its opposite end to one end of a lever arm so that the axis of the first link and the axis of the first crank arm lie along a common center line when the lever arm is in a first position, actuator means connected to the distal end of said second crank arm for rotating the crank arms in either a clockwise or a counter-clockwise direction as the actuator is extended and retracted whereby the lever arm is moved between said first position and a second position.

8. The apparatus of claim 7 wherein said shaft, said lever arm and said actuator means are mounted within a frame.

9. The apparatus for claim 8 that further includes a second link for connecting the distal end of said second crank arm to said actuator.

10. The apparatus of claim 7 wherein said first crank arm and said second crank arm are secured to a common hub which is rotatably supported upon said shaft.

11. The apparatus of claim 9 that further includes means for adjusting the length of said first and second links.

12. The apparatus of claim 7 that further includes a stop means for interrupting the motion of the lever arm when said lower arm is moved to a second position.

13. The apparatus of claim 7 wherein said actuator is a hydraulic cylinder having a piston rod that is connected to the distal end of said second crank arm.

14. Apparatus for turning a lever arm that includes an actuator having a member that reciprocates along a predetermined path of travel, a crank mounted upon a fixed shaft to form a first pivotal connection between the crank and said shaft, said crank being rotatably connected to said actuator member, a link having a proximal end and a distal end, said proximal end of said link means forming a second pivotal connection with said crank, a lever arm for moving a device between a first position and a second position that forms a third pivotal connection with said crank, and said first, second and third pivotal connection being brought into alignment along a common centerline when said lever arm is placed in one of said positions by said crank.

15. The apparatus of claim 14 wherein said crank is a triangular shaped element and first and second pivotal connections are located at two corners of said element.

16. The apparatus of claim 15 wherein said actuator is rotatably connected to the element at a third corner.

17. The apparatus of claim 14 wherein said crank contains a pair of angularly disposed crank arms each joined at one end to a hub that is rotatably mounted on said shaft.

18. The apparatus of claim 17 where the opposite end of one crank arm is rotatably joined to said actuator member and the opposite end of the other crank arm forms a second pivotal connection with said link.

* * * * *